US008735490B2

(12) United States Patent
Chung et al.

(10) Patent No.: US 8,735,490 B2
(45) Date of Patent: *May 27, 2014

(54) THERMOPLASTIC RESIN COMPOSITION HAVING IMPROVED IMPACT STRENGTH AND MELT FLOW PROPERTIES

(75) Inventors: Jin Hwa Chung, Uiwang-si (KR); Kee Hae Kwon, Uiwang-si (KR); Ja Kwan Koo, Uiwang-si (KR); Il Jin Kim, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 192 days.

This patent is subject to a terminal disclaimer.

(21) Appl. No.: 12/971,333

(22) Filed: Dec. 17, 2010

(65) Prior Publication Data

US 2011/0160377 A1 Jun. 30, 2011

(30) Foreign Application Priority Data

Dec. 30, 2009 (KR) .................. 10-2009-0134973
Oct. 1, 2010 (KR) .................. 10-2010-0096046

(51) Int. Cl.
*C08L 51/04* (2006.01)
*C08L 55/02* (2006.01)
*C08L 35/06* (2006.01)
*C08L 25/12* (2006.01)

(52) U.S. Cl.
CPC .............. *C08L 51/04* (2013.01); *C08L 55/02* (2013.01); *C08L 35/06* (2013.01); *C08L 25/12* (2013.01)
USPC .............. 524/504; 524/521; 525/70; 525/72

(58) Field of Classification Search
CPC ......... C08L 35/06; C08L 51/04; C08L 55/02; C08L 25/12
USPC .......... 525/63, 70, 72, 80, 100, 209; 526/279; 524/504, 521
See application file for complete search history.

(56) References Cited

U.S. PATENT DOCUMENTS

| | | | |
|---|---|---|---|
| 3,898,300 A * | 8/1975 | Hilliard .................. | 525/106 |
| 4,400,333 A | 8/1983 | Neefe | |
| 4,634,734 A | 1/1987 | Hambrecht et al. | |
| 4,997,883 A | 3/1991 | Fischer et al. | |
| 5,239,001 A | 8/1993 | Fischer et al. | |
| 5,274,031 A | 12/1993 | Eichenauer et al. | |
| 5,306,778 A | 4/1994 | Ishida et al. | |
| 5,354,796 A * | 10/1994 | Creecy et al. .................. | 524/114 |
| 6,063,889 A * | 5/2000 | Friebe et al. .................. | 528/32 |
| 6,111,024 A | 8/2000 | McKee et al. | |
| 6,337,371 B2 * | 1/2002 | Kurata et al. .................. | 525/63 |
| 6,380,304 B1 * | 4/2002 | Vanspeybroeck et al. ...... | 525/70 |
| 6,613,824 B2 | 9/2003 | Campbell et al. | |
| 6,630,524 B1 | 10/2003 | Lim et al. | |
| 6,686,404 B1 | 2/2004 | Eckel et al. | |
| 6,849,689 B2 | 2/2005 | Yamada et al. | |
| 7,094,818 B2 | 8/2006 | Lim et al. | |
| 7,294,659 B2 | 11/2007 | Yatake | |
| 7,767,738 B2 | 8/2010 | Gaggar et al. | |
| 7,956,127 B2 | 6/2011 | Lee et al. | |
| 8,119,726 B2 | 2/2012 | Lim et al. | |
| 8,304,494 B2 | 11/2012 | Park et al. | |
| 2001/0009946 A1 | 7/2001 | Catsman et al. | |
| 2002/0151624 A1 | 10/2002 | Kobayashi | |
| 2003/0139504 A1 | 7/2003 | Miebach et al. | |
| 2004/0013882 A1 | 1/2004 | Gorny et al. | |
| 2004/0249027 A1 | 12/2004 | Lim et al. | |
| 2005/0159533 A1 | 7/2005 | Nabeshima et al. | |
| 2005/0245648 A1 | 11/2005 | Lim et al. | |
| 2007/0249767 A1 * | 10/2007 | Kang et al. .................... | 524/115 |
| 2007/0287799 A1 | 12/2007 | Ha et al. | |
| 2009/0054568 A1 | 2/2009 | Uejima et al. | |
| 2010/0240831 A1 * | 9/2010 | Kim et al. ...................... | 524/878 |
| 2011/0009524 A1 | 1/2011 | Kwon et al. | |
| 2011/0021677 A1 | 1/2011 | Kwon et al. | |
| 2011/0160377 A1 | 6/2011 | Chung et al. | |

FOREIGN PATENT DOCUMENTS

| | | | |
|---|---|---|---|
| CN | 1377913 | A | 11/2002 |
| CN | 101061179 | A | 10/2007 |
| DE | 19614845 | A1 | 10/1997 |
| DE | 19801198 | A1 | 7/1999 |

(Continued)

OTHER PUBLICATIONS

JP 08239544 a Machine Translation, JPO Advanced Industrial Property Network (AIPN), Sep. 1996.*
JP 08-239544A (1996), machine translation, JPO Advanced Industrial Property Network (AIPN).*
KR 648114 B1 (2006), machine translation, Korean Patient Information Online Network (K-PION).*
Office Action in commonly owned U.S. Appl. No. 12/961,877 mailed Jul. 30, 2012, pp. 1-14.
European Search Report in commonly owned European Application No. 10194938.6 dated Jul. 21, 2011, pp. 1-5.
Notice of Allowance in commonly owned U.S. Appl. No. 12/961,877 mailed Jun. 19, 2013, pp. 1-10.
Final Office Action in commonly owned U.S. Appl. No. 12/961,877 mailed Nov. 28, 2012, pp. 1-10.

(Continued)

*Primary Examiner* — Susannah Chung
*Assistant Examiner* — Josephine Chang
(74) *Attorney, Agent, or Firm* — Additon, Higgins, Pendleton & Ashe, P.A.

(57) ABSTRACT

An aromatic vinyl thermoplastic resin composition includes (A) about 10 to about 99% by weight of a thermoplastic resin (A) including (a1) an aromatic vinyl copolymer resin, (a2) a rubber-modified vinyl graft copolymer, or a combination of (a1) and (a2); and (B) about 1 to about 90% by weight of a branched aromatic vinyl copolymer resin including a silicon based compound. The branched aromatic vinyl copolymer includes a copolymer prepared by copolymerizing (b1) about 10 to about 85% by weight of an aromatic vinyl based monomer; (b2) about 10 to about 85% by weight of an unsaturated nitrile based monomer; (b3) about 1 to about 50% by weight of an aromatic methacrylate, aliphatic methacrylate, or a combination thereof; and (b4) about 0.1 to about 20% by weight of a silicon based compound having two or more unsaturated functional groups.

16 Claims, No Drawings

(56) References Cited

FOREIGN PATENT DOCUMENTS

| | | | |
|---|---|---|---|
| EP | 0370344 A2 | | 5/1990 |
| EP | 0771852 A2 | | 5/1997 |
| EP | 0909790 A1 | | 4/1999 |
| EP | 1069154 A | | 1/2001 |
| EP | 1209163 A1 | | 5/2002 |
| JP | 08-239544 A | | 9/1996 |
| JP | 08239544 A | * | 9/1996 |
| JP | 10-017762 A | | 1/1998 |
| JP | 2002-348457 A | | 12/2002 |
| KR | 648114 B1 | * | 11/2006 |
| KR | 885819 B1 | * | 2/2009 |
| WO | 99/57198 A1 | | 11/1999 |
| WO | 00/18844 A1 | | 4/2000 |
| WO | 03/020827 A1 | | 3/2003 |
| WO | 03/022928 A1 | | 3/2003 |
| WO | 03/042303 A1 | | 5/2003 |
| WO | 03/042305 A1 | | 5/2003 |
| WO | 2004/007611 A1 | | 1/2004 |
| WO | 2009/128601 A | | 10/2009 |
| WO | WO 2009128601 A1 | * | 10/2009 |

OTHER PUBLICATIONS

Advisory Action in commonly owned U.S. Appl. No. 12/961,877 mailed Mar. 12, 2013, pp. 1-2.

European Search Report for commonly owned European Application No. EP 04808586, completed on Sep. 25, 2007.

Chinese Office Action in commonly owned Chinese Application No. 200880128614.0 dated Mar. 7, 2012, pp. 1-5.

English-translation of Chinese Office Action in commonly owned Chinese Application No. 200880128614.0 dated Mar. 7, 2012, pp. 1-2.

European Search Report in commonly owned European Application No. 07024808, dated Mar. 18, 2008, pp. 1-2.

Machine Translation of JP 10-017762, (2011).

Derwent Abstract of JP 2002348457 (A) (2003).

Full English Translation of JP-10-017762 (2011).

* cited by examiner

US 8,735,490 B2

THERMOPLASTIC RESIN COMPOSITION HAVING IMPROVED IMPACT STRENGTH AND MELT FLOW PROPERTIES

CROSS-REFERENCE TO RELATED APPLICATIONS

This application claims priority from Korea Patent Application No. 2009-0134973, filed on Dec. 30, 2009, and Korea Patent Application No. 2010-0096046, filed on Oct. 1, 2010, in the Korean Intellectual Property Office, the disclosures of each of which are incorporated herein by reference in their entirety.

FIELD OF THE INVENTION

The present invention relates to an aromatic vinyl thermoplastic resin composition.

BACKGROUND OF THE INVENTION

Thermoplastic resins generally have lower specific gravity than glass or metal and also can have excellent physical properties such as compactability, impact resistance, and the like. Recently, plastic resins are rapidly replacing glass or metal in electronic goods to provide larger, more lightweight and less expensive products. Further, applications for plastic resins are expanding from electronic components to automobile parts. Accordingly, the function and appearance of plastic resins used in the production of exterior materials for various products are becoming increasingly important and demand for improved external appearance and workability of such resins is also increasing.

Acrylonitrile-butadiene-styrene copolymer (ABS) resins are prepared by dispersing a graft ABS copolymer (g-ABS) resin into a matrix polymer of a styrene-acrylonitrile copolymer (SAN) resin. The graft ABS copolymer (g-ABS) is a copolymer in which aromatic vinyl compounds (such as styrene monomers) and unsaturated nitrile-based compounds (such as acrylonitrile monomers) are grafted to a butadiene-based rubber polymer as a central or a core portion. Such ABS resins have excellent properties, such as workability, impact resistance, heat resistance, chemical resistance, mechanical strength, melt strength and the like, and also have excellent coloring properties and gloss. Accordingly, ABS resins are widely used in various electric, electronic and miscellaneous components requiring an aesthetically pleasing external appearance.

However, in many applications, ABS resins should also have resistance against strong chemicals such as acetic acid and industrial oils without cracking while maintaining excellent impact resistance, for example, when used in interior and exterior materials of electric and electronic appliances such as mixers, washing machines, electric fans, and the like. Such materials are subject to repetitive stress due to the driving force of motors. Accordingly, such interior and exterior materials should be able to withstand repetitive stress for a predetermined length of time or longer without cracking or breaking.

Recently, there are increasing demands for plastic resins having a variety of special complex properties for use in electronic parts. In particular, electric parts are becoming thinner and more luxurious, thereby increasing the importance of plastic resin properties such as high impact strength, flow property and coloring. Accordingly, the demand for ABS resin having excellent impact resistance and flowability are increasing.

To improve the impact resistance of an ABS resin, the molecular weight of the SAN resin or the rubber content of the ABS resin can be increased. While this may improve impact resistance, however, these techniques fail to improve flowability and heat resistance.

SUMMARY OF THE INVENTION

In order to overcome such problems, the present invention is directed to an aromatic vinyl thermoplastic resin composition in which an aromatic vinyl copolymer resin, a rubber modified vinyl graft resin, or a combination thereof further includes a branched aromatic vinyl copolymer resin including a silicon based compound. The aromatic vinyl thermoplastic resin composition of the invention can exhibit improved impact strength and melt flow properties. Further, the present invention provides plastic articles made using the above resin composition.

The present invention provides an aromatic vinyl based thermoplastic resin composition comprising (A) about 10 to about 99% by weight of a thermoplastic resin including (a1) an aromatic vinyl copolymer resin, (a2) a rubber-modified vinyl graft copolymer resin, or a combination thereof; and (B) about 1 to about 90% by weight of a branched aromatic vinyl copolymer resin including a silicon based compound.

In exemplary embodiments of the invention, the branched aromatic vinyl copolymer resin including a silicon based compound (B) can have a weight average molecular weight of about 5000 to about 5,000,000.

The branched aromatic vinyl copolymer resin including a silicon based compound (B) can be a copolymer or a combination of copolymers prepared by copolymerizing an aromatic vinyl based monomer (b1), an unsaturated nitrile based monomer (b2), a (meth)acrylic monomer (b3), and a silicon based compound having two or more unsaturated functional groups (b4).

In exemplary embodiments, the branched aromatic vinyl copolymer resin including a silicon based compound (B) is a copolymer or a combination of copolymers prepared by copolymerizing (b1) about 10 to about 85% by weight of an aromatic vinyl based monomer; (b2) about 10 to about 85% by weight of an unsaturated nitrile based monomer; (b3) about 1 to about 50% by weight of a (meth)acrylic monomer; and (b4) about 0.1 to about 20% by weight of a silicon based compound having two or more unsaturated functional groups.

The aromatic vinyl thermoplastic resin composition can further include one or more addictives selected from the group consisting of surfactants, nucleating agents, coupling agents, fillers, plasticizers, impact modifiers, lubricants, antimicrobial agents, parting agents, heat stabilizers, antioxidants, light stabilizers, compatibilizers, inorganic fillers, dyes, stabilizers, antistatic agents, pigments, flame proofing agents and mixtures thereof.

The aromatic vinyl thermoplastic resin composition of the invention can have an Izod impact strength (⅛") of about 15 to about 60 kgf·cm/cm measured according to ASTM D256 and/or a melt index of about 15 to about 60 g/10 min measured according to ASTM D1238 (220° C., 10 kg).

The present invention also provides pellets prepared by extruding the above aromatic vinyl thermoplastic resin composition.

The present invention further provides plastic articles prepared from the aromatic vinyl thermoplastic resin composition, for example by extrusion, injection, or vacuum molding techniques.

In exemplary embodiments of the invention the aromatic vinyl thermoplastic resin composition can be mixed or alloyed with one or more other resins, such as but not limited to, polycarbonate (PC) resins, polymethylmethacrylate (PMMA) resins, polyolefin resins, polyphenylene ether (PPE) resins, polyester resins such as polyethylene terephthalate (PET), polyamide resins, polyimide resins, and the like, and mixtures thereof.

The present invention further provides the alloyed aromatic vinyl thermoplastic resin composition as above.

DETAILED DESCRIPTION OF THE INVENTION

The present invention will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

Unless otherwise stated herein, the term "(meth)acrylic" is intended to include "acrylic" and "methacrylic."

The present invention provides an aromatic vinyl based thermoplastic resin composition comprising (A) about 10 to about 99% by weight of a thermoplastic resin including (a1) an aromatic vinyl copolymer resin, (a2) a rubber-modified vinyl graft copolymer, or a combination of (a1) and (a2); and (B) about 1 to about 90% by weight of a branched aromatic vinyl copolymer resin including a silicon based compound.

In exemplary embodiments, the aromatic vinyl thermoplastic resin composition of the invention comprises a blend of both the aromatic vinyl copolymer resin (a1) and the rubber modified vinyl graft resin (a2), and a branched aromatic vinyl copolymer resin including a silicon based compound (B), which composition can exhibit both improved impact strength and melt flow properties and accordingly can have good molding properties.

(a1) Aromatic Vinyl Copolymer Resin

The aromatic vinyl copolymer resin of the present invention can be prepared by copolymerizing about 50 to about 95% by weight of one or more aromatic vinyl compounds and about 5 to about 50% by weight of one or more compounds copolymerizable with the aromatic vinyl compound. The aromatic vinyl copolymer resin can be prepared using methods known in the art, such as emulsion polymerization, suspension polymerization, solution polymerization or bulk polymerization.

In some embodiments, the aromatic vinyl compound may be used in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95% by weight. Further, according to some embodiments of the present invention, the amount of the aromatic vinyl compound can be in a range from about any of the foregoing amounts to about any other of the foregoing amounts.

In some embodiments, the compound copolymerizable with the aromatic vinyl compound may be used in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% by weight. Further, according to some embodiments of the present invention, the amount of the compound copolymerizable with the aromatic vinyl compound can be in a range from about any of the foregoing amounts to about any other of the foregoing amounts.

Examples of the aromatic vinyl compound may include without limitation styrene, α-methylstyrene, p-methylstyrene, vinyl toluene, 2,4-dimethylstyrene, halogen or C1-C10 alkyl substituted styrene, and the like, and combinations thereof. In exemplary embodiments, the aromatic vinyl compound can include styrene.

Examples of the compound copolymerizable with the aromatic vinyl compound include without limitation unsaturated nitrile compounds, (meth)acrylic acid alkyl esters, maleic anhydride, maleimide based compounds, and the like, and combinations thereof.

Examples of the unsaturated nitrile compound may include without limitation acrylonitrile, methacrylonitrile, and the like, and combinations thereof.

Examples of (meth)acrylic acid alkyl esters may include without limitation methacrylic acid C1-C8 alkyl esters, acrylic acid C1-C8 alkyl esters, and the like, and combinations thereof. The methacrylic acid C1-C8 alkyl esters and the acrylic acid C1-C8 alkyl esters are esters of methacrylic acid and acrylic acid, respectively, which are obtained from monohydric alcohols having one to eight carbon atoms. In exemplary embodiments of the invention the (meth)acrylic acid alkyl esters may include without limitation methacrylic acid methyl ester, methacrylic acid ethyl ester, acrylic acid ethyl ester, acrylic acid methyl ester, methacrylic acid propyl ester, and the like, and combinations thereof.

Examples of the maleimide based compound may include without limitation C1-C4 alkyl N-substituted maleimide, phenyl N-substituted maleimide, and the like, and combinations thereof.

In an exemplary embodiment of the invention the aromatic vinyl copolymer (a1) includes an aromatic vinyl copolymer or a combination of aromatic vinyl copolymers prepared by copolymerizing about 50 to about 95% by weight of styrene, α-methylstyrene, halogen-substituted styrene, C1-C10 alkyl-substituted styrene or a combination thereof; and about 5 to about 50% by weight of acrylonitrile, methacrylonitrile, (meth)acrylic acid C1-C8 alkyl ester, maleic anhydride, C1-C4 alkyl N-substituted maleimide, phenyl N-substituted maleimide, or a combination thereof.

Examples of the aromatic vinyl copolymer (a1) may include without limitation a styrenic copolymer prepared from styrene and acrylonitrile, and optionally methacrylic acid methyl ester; α-methylstyrene and acrylonitrile, and optionally methacrylic acid methyl ester; and styrene, α-methylstyrene and acrylonitrile, and optionally methacrylic acid methyl ester.

The aromatic vinyl copolymer (a1) can have a weight average molecular weight of about 15,000 to about 250,000.

In another exemplary embodiment the aromatic vinyl copolymer (a1) can be a copolymer consisting of styrene and maleic anhydride, which can be prepared by a continuous bulk polymerization process or solution polymerization process. In exemplary embodiments, the amount of maleic anhydride can be about 5 to about 50% by weight, although the present invention is not so limited and the ratio of styrene and maleic anhydride can be changed and can be broad in scope. In some embodiments, the maleic anhydride may be used in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% by weight. Further, according to some embodiments of the present invention, the amount of the maleic anhydride can be in a range from about any of the foregoing amounts to about any other of the foregoing amounts.

Furthermore, the styrene/maleic anhydride copolymer may have a broad range of weight average molecular weight. In an exemplary embodiment, the styrene/maleic anhydride copolymer may have a weight average molecular weight of about 15,000 to about 250,000, although the present invention is not limited to the same.

In another exemplary embodiment, the aromatic vinyl copolymer (a1) may be produced as a by-product of the production of a rubber-modified vinyl based graft copolymer (a2) as described below. In particular, this occurs more frequently when grafting a small amount of rubbery polymer with an excess of monomer mixture or when using an excess of chain transfer agent as a molecular weight control agent. The amount of the aromatic vinyl copolymer used in preparing resin composition of the present invention is not intended to include the by-product obtained in the production of the graft copolymer (a2) Rubber-Modified Vinyl Graft Copolymer The rubber-modified vinyl graft copolymer (a2) can be prepared by graft-polymerizing about 5 to about 95% by weight of a rubbery polymer and about 5 to about 95% by weight of a vinyl based monomer mixture. The rubber modified vinyl based graft copolymer (a2) can be prepared by methods well known to the skilled artisan, such as emulsion polymerization, suspension polymerization, bulk polymerization, and solution polymerization.

In some embodiments, the amount of the rubbery polymer can range from about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95% by weight. Further, according to some embodiments of the present invention, the amount of the rubbery polymer can be in a range from about any of the foregoing amounts to about any other of the foregoing amounts.

In some embodiments, the amount of the vinyl based monomer mixture can range from about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95% by weight. Further, according to some embodiments of the present invention, the amount of the vinyl based monomer mixture can be in a range from about any of the foregoing amounts to about any other of the foregoing amounts.

The vinyl based monomer mixture can include about 50 to about 95% by weight of a first vinyl compound comprising an aromatic vinyl compound, (meth)acrylic acid alkyl ester or a combination thereof and about 5 to about 50% by weight of a second vinyl compound comprising an unsaturated nitrile compound, (meth)acrylic acid alkyl ester (which can be the same or different from the (meth)acrylic acid alkyl ester of the first vinyl compound), maleimide compound or a combination thereof.

In some embodiments, the vinyl based monomer mixture can include the first vinyl compound in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95% by weight. Further, according to some embodiments of the present invention, the vinyl based monomer mixture can include the first vinyl compound in an amount of from about any of the foregoing amounts to about any other of the foregoing amounts.

In some embodiments, the vinyl based monomer mixture can include the second vinyl compound in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% by weight. Further, according to some embodiments of the present invention, the vinyl based monomer mixture can include the second vinyl compound in an amount of from about any of the foregoing amounts to about any other of the foregoing amounts.

In exemplary embodiments the vinyl based monomer mixture can include about 60 to about 90% by weight of the first vinyl compound including an aromatic vinyl compound, (meth)acrylic acid alkyl ester or a combination thereof and about 10 to about 40% by weight of the second vinyl compound including an unsaturated nitrile compound, (meth)acrylic acid alkyl ester (which can be the same or different from the, (meth)acrylic acid alkyl ester of the first vinyl compound), maleimide compound or a combination thereof.

Examples of the aromatic vinyl based compound can include without limitation styrene, α-methylstyrene, p-methylstyrene, vinyltoluene, 2,4-dimethylstyrene, halogen or C1-C10 alkyl substituted styrene, and the like, and combinations thereof.

Examples of the (meth)acrylic acid alkyl esters may include without limitation methacrylic acid C1-C8 alkyl esters, acrylic acid C1-C8 alkyl esters, and combinations thereof. The methacrylic acid C1-C8 alkyl esters and acrylic acid C1-C8 alkyl esters may be C1-C8 alkyl esters of methacrylic acid and acrylic acid, respectively, and may be produced from monohydric alcohol including one to eight carbon atoms. In an exemplary embodiment the (meth)acrylic acid alkyl esters may include without limitation methacrylic acid methyl ester, methacrylic acid ethyl ester, acrylic acid ethyl ester, acrylic acid methyl ester, methacrylic acid propyl ester, and the like, and combinations thereof.

Examples of the unsaturated nitrile compound may include without limitation acrylonitrile, methacrylonitrile, and the like, and combinations thereof.

Examples of the maleimide compound may include without limitation C1-C4 alkyl N-substituted maleimide, phenyl N-substituted maleimide, and the like, and combinations thereof.

Examples of the rubbery polymer may include without limitation butadiene rubbers, acrylic rubbers, ethylene/propylene rubbers, styrene-butadiene, acrylonitrile/butadiene rubbers, isoprene rubbers, ethylene-propylene-diene monomer (EPDM), polyorganosiloxane/polyalkyl(meth)acrylate rubber complex, and the like, and combinations thereof.

The average size of the rubber particles can range from about 0.05 to about 4 µm taking into account the desired impact strength and appearance of the resin composition. In some embodiments, the particle diameter of the rubber can range from about 0.05, 0.06, 0.07, 0.08, 0.09, 0.1, 0.2, 0.3, 0.4, 0.5, 0.6, 0.7, 0.8, 0.9, 1, 2, 3 or 4 µm. Further, according to some embodiments of the present invention, the particle diameter of the rubber can be in a range from about any of the foregoing sizes to about any other of the foregoing sizes.

In one exemplary embodiment the rubber-modified vinyl graft copolymer (a2) may be prepared by graft-polymerizing about 5 to about 95% by weight of a monomer mixture, which comprises about 50 to about 95% by weight of styrene, α-methyl styrene, halogen or C1-C10 alkyl substituted styrene, C1-C8 methacrylic acid alkyl ester, C1-C8 acrylic acid alkyl ester or a combination thereof and about 5 to about 50% by weight of acrylonitrile, methacrylonitrile, C1-C8 methacrylic acid alkyl ester, C1-C8 acrylic acid alkyl ester, maleic anhydride, C1-C4 alkyl- or phenyl-N-substituted maleimide or a combination thereof, to about 5 to about 95% by weight of a rubber comprising butadiene rubber, acrylic rubber, ethylene/propylene rubber, styrene-butadiene, acrylonitrile/butadiene rubber, isoprene rubber, ethylene-propylene-diene monomer (EPDM), polyorganosiloxane/polyalkyl(meth)acrylate rubber complex, or a combination thereof.

Examples of the rubber-modified vinyl graft copolymer (a2) may include without limitation a copolymer prepared by graft-copolymerizing butadiene rubber, acrylic rubber or styrene-butadiene rubber with a mixture including styrene, acrylonitrile and optionally (meth)acrylic acid alkyl ester monomer.

Other examples of the rubber-modified vinyl graft copolymer (a2) may include without limitation copolymer prepared by graft-copolymerizing butadiene rubber, acrylic rubber or styrene-butadiene rubber with (meth)acrylic acid methyl ester monomer.

In exemplary embodiments, the rubber-modified vinyl graft copolymer (a2) is an ABS graft copolymer.

In some embodiments, the thermoplastic resin (A) may include the aromatic vinyl copolymer resin (a1) in an amount of about 1 to about 100% by weight. In some embodiments, the thermoplastic resin (A) may include the aromatic vinyl copolymer resin (a1) in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100% by weight. Further, according to some embodiments of the present invention, the amount of the aromatic vinyl copolymer (a1) can be in a range from about any of the foregoing amounts to about any other of the foregoing amounts.

In some embodiments, the thermoplastic resin (A) may include the rubber modified vinyl graft copolymer resin (a2) in an amount of about 0 to about 99% by weight. In some embodiments, the thermoplastic resin (A) may not include the rubber modified vinyl graft copolymer resin (a2) (i.e., the thermoplastic resin (A) may include 0% by weight of the rubber modified vinyl graft copolymer resin (a2)). In some embodiments, the rubber modified vinyl graft copolymer resin (a2) may be present in the thermoplastic resin (A), i.e., the thermoplastic resin (A) may include the rubber modified vinyl graft copolymer resin (a2) in an amount of greater than and/or about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99% by weight. Further, according to some embodiments of the present invention, the amount of the rubber modified vinyl graft copolymer resin (a2) can be in a range from about any of the foregoing amounts to about any other of the foregoing amounts.

The aromatic vinyl-based thermoplastic resin composition of the invention may include the thermoplastic resin (A) in an amount ranging from about 10% to about 99% by weight, based on the total weight of the thermoplastic resin (A) and the branched aromatic vinyl copolymer resin including a silicon based compound (B). In some embodiments, the aromatic vinyl-based thermoplastic resin composition of the invention can include the thermoplastic resin (A) in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99% by weight. Further, according to some embodiments of the present invention, the amount of the thermoplastic resin (A) can be in a range from about any of the foregoing amounts to about any other of the foregoing amounts.

(B) Branched Aromatic Vinyl Copolymer Resin Including a Silicon Based Compound

The branched aromatic vinyl copolymer resin including a silicon based compound (B) of the present invention is copolymer comprising an aromatic vinyl based monomer (b1), an unsaturated nitrile based monomer (b2), a (meth) acrylic monomer (b3) and a silicon based compound having two or more unsaturated functional groups (b4).

In one embodiment, the branched aromatic vinyl copolymer resin (B) may be a copolymer of about 10 to about 85% by weight of an aromatic vinyl based monomer (b1), about 10 to about 85% by weight of an unsaturated nitrile based monomer (b2), about 1 to about 50% by weight of a (meth)acrylic monomer (b3), and about 0.1 to about 20% by weight, for example about 0.1 to about 8% by weight, of a silicon based compound having two or more unsaturated functional groups (b4), wherein each of the foregoing weight percents is based on the total weight of the monomer mixture.

In some embodiments, the aromatic vinyl based monomer (b1) may be used in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, or 85% by weight. Further, according to some embodiments of the present invention, the amount of the aromatic vinyl based monomer (b1) can be in a range from about any of the foregoing amounts to about any other of the foregoing amounts.

In some embodiments, the unsaturated nitrile based monomer (b2) may be used in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, or 85% by weight. Further, according to some embodiments of the present invention, the amount of the unsaturated nitrile based monomer can be in a range from about any of the foregoing amounts to about any other of the foregoing amounts.

In some embodiments, the (meth)acrylic monomer (b3) may be used in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% by weight. Further, according to some embodiments of the present invention, the amount of the (meth)acrylic monomer (b3) can be in a range from about any of the foregoing amounts to about any other of the foregoing amounts.

In some embodiments, the silicon based compound (b4) may be used in an amount of about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, or 20% by weight. Further, according to some embodiments of the present invention, the amount of the silicon based compound (b4) can be in a range from about any of the foregoing amounts to about any other of the foregoing amounts. If the amount of (b4) is more than about 20% by weight, flow properties and workability may be deteriorated. If the amount of (b4) is less than about 0.1% by weight, the improved effect of impact strength may decrease.

The weight average molecular weight of the branched styrenic copolymer resin including a silicon based compound (B) can be about 5,000 to about 5,000,000.

Examples of the aromatic vinyl based monomer (b1) include without limitation styrene, p-methylstyrene, α-methylstyrene, halogen-substituted styrene, C1-C10 alkyl-substituted styrene, and the like, and mixtures thereof.

Examples of the unsaturated nitrile based monomer (b2) include without limitation acrylonitrile, methacrylonitrile, and the like, and mixtures thereof.

The (meth)acrylic monomer (b3) may be an aromatic methacrylate, an aliphatic methacrylate, or a combination thereof having a structure represented by Formula 1, Formula 2, or a combination thereof as set forth below, and may also be a combination of one or more (meth)acrylic monomers copolymerizable with an aromatic methacrylate, aliphatic methacrylate, or a combination thereof having a structure represented by Formula 1, Formula 2, or a combination thereof as set forth below.

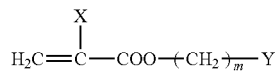

[Formula 1]

wherein m is an integer from 0 to 20, X is hydrogen or methyl, Y is methyl, cyclohexyl, phenyl, benzyl, methylphenyl, methylethylphenyl, methoxyphenyl, cyclohexylphenyl, chlorophenyl, bromophenyl, phenylphenyl, or benzyl phenyl.

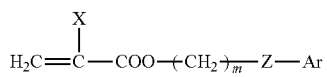

[Formula 2]

wherein m is an integer from 0 to 20, X is hydrogen or methyl, Z is oxygen (O) or sulfur (S), Ar is methyl, cyclohexyl, phenyl, benzyl, methylphenyl, methylethylphenyl, methoxyphenyl, cyclohexylphenyl, chlorophenyl, bromophenyl, phenylphenyl, or benzyl phenyl.

Examples of the (meth)acrylic monomer (b3) may include without limitation methacrylic acid esters, acrylic acid esters, unsaturated carboxylic acids, acid anhydride, esters containing a hydroxy group, and the like, and combinations thereof. Examples of (meth)acrylic monomer may include without limitation methacrylic acid esters including methyl methacrylate, ethyl methacrylate, propyl methacrylate, butyl methacrylate, hexyl methacrylate, 2-ethylhexyl methacrylate, cyclohexyl methacrylate, phenyl methacrylate, benzyl methacrylate, and the like; acrylic esters including methyl acrylate, ethyl acrylate, propyl acrylate, butyl acrylate, hexyl acrylate, 2-ethylhexyl acrylate, cyclohexyl acrylate, phenyl acrylate, benzyl acrylate, and the like; unsaturated carboxylic acid including acrylic acid, methacrylic acid, and the like; acid anhydride including maleic anhydride; esters containing a hydroxyl group such as 2-hydroxyethyl acrylate, 2-hydroxypropyl acrylate, monoglycerol acrylate, and the like; and combinations thereof.

Further examples of the aromatic methacrylate, aliphatic methacrylate, or combination thereof include without limitation phenoxymethacrylate, phenoxyethylmethacrylate, 2-ethylphenoxymethacrylate, 2-ethylthiophenylmethacrylate, 2-ethylaminophenylmethacrylate, 2-phenylethylmethacrylate, 3-phenylpropylmethacrylate, 4-phenylbutylmethacrylate, 2-2-methylphenylethylmethacrylate, 2-3-methylphenylethylmethacrylate, 2-4-methylphenylethylmethacrylate, 2-(4-propylphenyl)ethylmethacrylate, 2-(4-(1-methylethyl)phenyl)ethylmethacrylate, 2-(4-methoxyphenyl)ethylmethacrylate, 2-(4-cyclohexylphenyl)ethylmethacrylate, 2-(2-chlorophenyl)ethylmethacrylate, 2-(3-chlorophenyl)ethylmethacrylate, 2-(4-chlorophenyl)ethylmethacrylate, 2-(4-bromophenyl)ethylmethacrylate, 2-(3-phenylphenyl)ethylmethacrylate, 2-(4-benzylphenyl)ethylmethacrylate, and the like, and combinations thereof.

The silicon based compound having two or more unsaturated functional groups (b4) may be a compound, or a combination of compounds, having two or more unsaturated functional groups at a terminal or side chain, such as a structure represented by Formula 3 below.

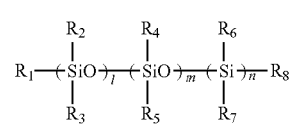

[Formula 3]

wherein l, m and n are each independently an integer from 0 to 100, with the proviso that l+m+n is not 0, $R_1$ to $R_8$ are each independently hydrogen, a hydrocarbon group such as a straight chain or branched $C_1$-$C_5$ alkyl, $C_4$-$C_6$ cycloalkyl, unsaturated $C_2$-$C_{12}$ alkyl, or $C_6$-$C_{10}$ aryl, a vinyl group, hydroxyl, amino, ureido, isocyanate, episulfide, epoxy or mercapto, with the proviso that at least two or more of $R_1$ to $R_8$ include a polymerizable unsaturated functional group.

In one embodiment, the silicon based compound (b4) may have a linear structure.

In another embodiment, the silicon based compound (b4) may have a cyclic structure in which $R_1$ and $R_8$ are bonded together.

Examples of the silicon based compound having two or more unsaturated functional groups (b4) may include without limitation dimethoxymethylvinylsilane, diethoxymethylvinylsilane, diacetoxymethylvinylsilane, 1,1,1,3,5,5,5,-heptamethyl-3-vinyltrisiloxane, 2,4,6,8-tetramethyl tetravinylcyclotetrasiloxane, α,ω-divinylpolydimethylsiloxane, modified-vinyl dimethylsiloxane, and the like, and combinations thereof.

The silicon based compound having two or more unsaturated functional groups (b4) can have a viscosity below about 5,000 cPs, for example about 1 to about 500 cPs. Also, the vinyl content of the silicon based compound having two or more unsaturated functional groups (b4) can range from about 0.05 to about 10 mmol/g.

If the vinyl content of the silicon based compound having two or more unsaturated functional groups (b4) is less than about 0.05 mmol/g, the aromatic vinyl copolymer resin (B) may not have a sufficiently branched structure. If the vinyl content of the silicon based compound having two or more unsaturated functional groups (b4) is more than about 10 mmol/g, the branched aromatic vinyl copolymer resin (B) may be excessively crosslinked, and both impact strength and flow property may not be improved.

The weight average molecular weight of the branched aromatic vinyl copolymer resin including a silicon based compound (B) can range from about 5,000 to about 5,000,000 g/mol. The branched aromatic vinyl copolymer resin including a silicon based compound (B) having a weight average molecular weight without the above range may impart improved workability and impact strength to the thermoplastic resin as well as help maintain existing properties thereof.

The branched aromatic vinyl copolymer resin including a silicon based compound according to the present invention has a branched structure to improve flow property as well as includes a silicon based compound to improve impact resistance of the resin and to be capable of obtaining a high molecular weight when copolymerizing.

The aromatic vinyl-based thermoplastic resin composition of the invention can include the branched aromatic vinyl copolymer resin including a silicon based compound (B) in an amount of about 1 to about 90% by weight, for example about 5 to about 50% by weight, and as another example about 10 to about 50% by weight, based on the total weight of the thermoplastic resin (A) and the branched aromatic vinyl copolymer resin including a silicon based compound (B). In some embodiments, the aromatic vinyl-based thermoplastic resin composition of the invention can include the branched aromatic vinyl copolymer resin (B) in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90% by weight. Further, according to some embodiments of the present invention, the amount of the branched aromatic vinyl copolymer resin (B) can be in a range from about any of the foregoing amounts to about any other of the foregoing amounts.

If the amount of the branched aromatic vinyl copolymer resin including a silicon based compound (B) is less than about 1% by weight, impact strength and flow property may not be sufficiently improved.

The branched aromatic vinyl copolymer resin including a silicon based compound (B) may be prepared by emulsion polymerization, suspension polymerization, solution polymerization or bulk polymerization.

In an exemplary embodiment of the invention the aromatic vinyl thermoplastic resin composition further may include one or more additives. Non-limiting examples of the additives include surfactants, nucleating agents, coupling agents, fillers, plasticizers, impact modifiers, lubricants, antimicrobial agents, release agents, heat stabilizers, antioxidants, light stabilizers, compatibilizers, inorganic fillers, dyes, stabilizers, antistatic agents, pigments, flame proofing agents, and the like, and mixtures thereof. The additives may be used in conventional amounts.

The aromatic vinyl thermoplastic resin composition according to the present invention can be prepared by a conventional process. For example, the resin composition of the present invention may be manufactured into the form of pellets by mixing the foregoing components and optionally one or more additives and then melting and extruding the mixture in an extruder. The manufactured pellets may be manufactured into various molded articles using known molding methods, such as injection molding, extrusion molding, vacuum molding, and cast molding.

The aromatic vinyl thermoplastic resin composition of the present invention can have excellent impact resistance, formability resulting from improved compatibility, and can be colored so that it may be molded into various products. The resin composition of the invention can be particularly suitable for the production of electric or electronic exterior materials, parts, parts of cars, lenses, glass and the like.

In one exemplary embodiment, the aromatic vinyl thermoplastic resin composition can be used in the production of various products including without limitation housings for electric and electronic goods such as TVs, washing machines, cassette players, MP3 players, digital multimedia broadcasting (DMB) devices, navigation systems, cellular phones, phones, game machines, audio devices, computers, printers, copying machines, and the like.

In exemplary embodiments, the aromatic vinyl thermoplastic resin composition of the invention can have an Izod impact strength (⅛") of about 15 to about 60 kgf·cm/cm measured according to ASTM D256 and/or a melt index of about 15 to about 60 g/10 min measured according to ASTM D1238 (220° C., 10 kg).

In some embodiments, the aromatic vinyl thermoplastic resin composition of the invention can have an Izod impact strength ranging from about 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 kgf·cm/cm. Further, according to some embodiments of the present invention, the impact strength of the aromatic vinyl thermoplastic resin composition can be in a range from about any of the foregoing amounts to about any other of the foregoing amounts.

In some embodiments, the aromatic vinyl thermoplastic resin composition of the invention can have a melt index ranging from about 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 g/10 min. Further, according to some embodiments of the present invention, the melt index of the aromatic vinyl thermoplastic resin composition can be in a range from about any of the foregoing amounts to about any other of the foregoing amounts.

The aromatic vinyl thermoplastic resin composition of the present invention can be mixed or alloyed with another resin. In one exemplary embodiment, the alloyed aromatic vinyl thermoplastic resin composition may be prepared by alloying the aromatic vinyl thermoplastic resin composition of the present invention and one or more resins including without limitation polycarbonate (PC) resins, polymethylmethacrylate (PMMA) resins, polyolefin resins, polyphenylene ether (PPE) resins, polyester resins such as polyethylene terephthalate (PET), polyamide resins, polyimide resins, and the like, and mixtures thereof. The alloyed composition can include the aromatic vinyl-based thermoplastic resin composition of the invention in an amount of about 1 to about 99% by weight and the other resin in an amount of about 1 to about 99% by weight.

In some embodiments, the alloyed composition can include the aromatic vinyl-based thermoplastic resin composition of the invention in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99% by weight. Further, according to some embodiments of the present invention, the amount of the aromatic vinyl-based thermoplastic resin composition of the invention can be in a range from about any of the foregoing amounts to about any other of the foregoing amounts.

In some embodiments, the alloyed composition can include the other resin of the invention in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99% by weight. Further, according to some embodiments of the present invention, the amount of the other resin of the invention can be in a range from about any of the foregoing amounts to about any other of the foregoing amounts.

The invention may be better understood by reference to the following examples which are intended for the purpose of illustration and are not to be construed as in any way limiting the scope of the present invention, which is defined in the claims appended hereto.

EXAMPLES

The following components are used in the following Examples and Comparative Examples:

(a1) Aromatic Vinyl Copolymer Resin

A styrene-acrylonitrile (SAN) copolymer resin having a weight average molecular weight of 150,000 is used, which is prepared by suspension-polymerizing 75 parts by weight of styrene and 25 parts by weight of acrylonitrile for 5 hours at 75° C.

(a2) Rubber-Modified Aromatic Vinyl Graft Copolymer

A polybutadiene rubber latex is used, which includes 45 parts by weight of butadiene content per total content of monomers. A mixture including 39 parts by weight of styrene, 16 parts by weight of acrylonitrile and 150 parts by weight of deionized water is added to the polybutadiene rubber latex. Further, 1.0 part by weight of oleic acid potassium, 0.4 parts by weight of cumenehydroperoxide and 0.3 parts by weight of t-dodecyl mercaptan chain-transfer agent as additives are added therein. After mixing, they are reacted for 5 hours at a constant temperature of 75° C. to produce a ABS graft latex. Sulfuric acid solution (1%) is added in the produced polymer latex. After coagulating the above polymer latex, the polymer latex is dried so that the graft copolymer resin is produced in powder form.

(B) Branched Aromatic Vinyl Copolymer Resins are Prepared by Including a Silicon Based Compound are Follows:

(B1) Branched Aromatic Vinyl Copolymer Resin Including a Silicon Based Compound-1

An aromatic vinyl copolymer having an average weight molecular weight of 120,000 is used, which is prepared by suspension-polymerizing 70.5 parts by weight of styrene, 23.5 parts by weight of acrylonitrile and 5 parts by weight of butylacrylate with 1 part by weight of vinyl modified dimethylsiloxane compound which has a viscosity of 100 cPs and a vinyl content of 0.5 mmol/g.

(B2) Branched Aromatic Vinyl Copolymer Resin Including a Silicon Based Compound-2

An aromatic vinyl copolymer having an average weight molecular weight of 600,000 is used, which is prepared by suspension-polymerizing 67.5 parts by weight of styrene, 22.5 parts by weight of acrylonitrile and 5 parts by weight of butylacrylate with 5 parts by weight of vinyl modified dimethylsiloxane compound which has a viscosity of 100 cPs and a vinyl content of 0.5 mmol/g.

(B3) Branched Aromatic Vinyl Copolymer Resin Including a Silicon Based Compound-3

An aromatic vinyl copolymer having an average weight molecular weight of 1,000,000 is used, which is prepared by suspension-polymerizing 64 parts by weight of styrene, 19 parts by weight of acrylonitrile and 5 parts by weight of butylacrylate with 10 part by weight of vinyl modified dimethylsiloxane compound which has a viscosity of 100 cPs and a vinyl content of 0.5 mmol/g.

(B4) Branched Aromatic Vinyl Copolymer Resin Including a Silicon Based Compound-4

An aromatic vinyl copolymer having an average weight molecular weight of 120,000 is used, which is prepared by suspension-polymerizing 66.7 parts by weight of styrene, 22.3 parts by weight of acrylonitrile and 10 parts by weight of butylacrylate with a 1 part by weight of vinyl modified dimethylsiloxane compound which has a viscosity of 100 cPs and a vinyl content of 0.5 mmol/g.

(B5) Branched Aromatic Vinyl Copolymer Resin Including a Silicon Based Compound-5

An aromatic vinyl copolymer having an average weight molecular weight of 120,000 is used, which is prepared by suspension-polymerizing 63 parts by weight of styrene, 21 parts by weight of acrylonitrile and 15 parts by weight of butylacrylate with a 1 part by weight of vinyl modified dimethylsiloxane compound which has a viscosity of 100 cPs and a vinyl content of 0.5 mmol/g.

(B6) Branched Aromatic Vinyl Copolymer Resin Including a Silicon Based Compound-6

An aromatic vinyl copolymer having an average weight molecular weight of 120,000 is used, which is prepared by suspension-polymerizing 74 parts by weight of styrene and 25 parts by weight of acrylonitrile with a 1 part by weight of vinyl modified dimethylsiloxane compound which has a viscosity of 100 cPs and a vinyl content of 0.5 mmol/g.

(B7) Linear Copolymer Resin-7

An aromatic vinyl copolymer having an average weight molecular weight of 120,000 is used, which is prepared by suspension-polymerizing 75 parts by weight of styrene, 25 parts by weight of acrylonitrile and 5 parts by weight of butylacrylate.

(B8) Branched Aromatic Vinyl Copolymer Resin Including a Silicon Based Compound-8

An aromatic vinyl copolymer having an average weight molecular weight of 250,000 is used, which is prepared by suspension-polymerizing 70.5 parts by weight of styrene, 23.5 parts by weight of acrylonitrile and 5 parts by weight of butylacrylate with a 1 part by weight of vinyl modified dimethylsiloxane compound which has a viscosity of 10 cPs and a vinyl content of 15 mmol/g.

Examples 1-6 and Comparative Examples 1-4

Each of the components is added in the amount represented in the following Table 1. The added components are uniformly mixed and melted with each other and then extruded through an extruder to prepare pellets. The extruder is a twin-screw extruder having a diameter of 45 mm and L/D=29. After drying the produced pellets at 70° C. for 6 hours, the pellets are molded into test specimens using a 6-oz injector.

The Izod impact strength (kgfcm/cm) is measured in accordance with ASTM 256 (⅛ inch, notched).

The flowability (Melt Flow Index, g/10 min) is measured in accordance with ASTM D-1238 (220° C./10 kg).

The flexural modulus is measured in accordance with ASTM D790 at a specimen thickness of ¼".

The flame retardancy of the test specimens is measured according to UL 94 VB at a specimen thickness of 1/12".

The color development is evaluated by measuring the L-value representing the brightness through a colorimeter, after a 1 part by weight of black colorant is added to the resin and the resin is extruded. The results are shown in Tables 2.

The heat resistance, Vicot softening temperature (VST), is measured according to ASTM D1525 under the condition of 5 kg.

TABLE 1

|  | Examples | | | | | | Comparative Examples | | | | |
| --- | --- | --- | --- | --- | --- | --- | --- | --- | --- | --- | --- |
|  | 1 | 2 | 3 | 4 | 5 | 6 | 1 | 2 | 3 | 4 | 5 |
| (a1) | 41.5 | 51.5 | 41.5 | 41.5 | 41.5 | 41.5 | 71.5 | 65 | 41.5 | 41.5 | 41.5 |
| (a2) | 28.5 | 28.5 | 28.5 | 28.5 | 28.5 | 28.5 | 28.5 | 35 | 28.5 | 28.5 | 28.5 |
| (B) (B1) | 30 | — | — | — | — | — | — | — | — | — | — |
| (B2) | — | 30 | 20 | — | — | — | — | — | — | — | — |
| (B3) | — | — | — | 30 | — | — | — | — | — | — | — |
| (B4) | — | — | — | — | 30 | — | — | — | — | — | — |
| (B5) | — | — | — | — | — | 30 | — | — | — | — | — |
| (B6) | — | — | — | — | — | — | — | — | 30 | — | — |
| (B7) | — | — | — | — | — | — | — | — | — | 30 | — |
| (B8) | — | — | — | — | — | — | — | — | — | — | 30 |
| Izod Impact strength (1/8") | 27.8 | 32.3 | 28.0 | 26.6 | 26.1 | 22.8 | 15.6 | 33 | 16.1 | 15.0 | 11.3 |
| Flowabiliy Index (220° C./10 kg) | 22.4 | 29.1 | 25.5 | 31.5 | 44.7 | 56.5 | 15.4 | 10.4 | 18.8 | 20.0 | 5.1 |
| Flexural modulus (MPa) | 21056 | 21529 | 21092 | 21255 | 20007 | 19344 | 21255 | 19817 | 21100 | 19010 | 19575 |
| VST (5 kg), ° C. | 97.2 | 96.3 | 97.8 | 94.6 | 89 | 84.4 | 99.2 | 98.4 | 98.0 | 96.4 | 97.5 |

Comparative example 1 prepared by blending a styrenic copolymer resin (SAN) and a rubber-modified vinyl graft copolymer exhibits lower impact strength as compared to comparative example 2, which includes a larger amount of the rubber-modified vinyl graft copolymer. However, although the impact strength of comparative example 2 may be improved by increasing the amount of rubber-modified vinyl graft copolymer, flowability and physical properties rapidly deteriorate.

Examples 1-4 of the invention demonstrate that a resin prepared by blending a styrenic copolymer resin (SAN), a rubber-modified vinyl graft copolymer, and a branched styrenic copolymer resin including a silicon based compound can exhibit both improved impact strength and flowability. Without being bound by any theory or explanation of the invention, it is currently believed that the impact strength is improved by increased molecular weight and silicon based compounds and flowablility and compactibility are improved by branched structures.

As shown in Examples 1 and 2, adding an appropriate amount of silicon compound can provide excellent impact strength and flow properties with minimal deterioration of heat resistance and of mechanical properties. Further, comparing the amount of the branched styrenic copolymer resin in Examples 2 and 3, as the amount increases, the impact strength and flow properties improve.

Examples, 1, 2 and 4, of the composition of the invention demonstrate that as the amount of silicon compounds increases, the flow properties and the impact strength of the resin improves. However, when the amount of silicon compounds exceeds the appropriate amount, the flow properties are increased while the impact strength decreases. As shown in Example 4, as the amount of silicon compound becomes larger, the improvement of impact strength gets smaller as compared to Example 2, but the flow properties increase more.

As shown in Examples 5 and 6, when a branched styrenic copolymer resin including a silicon based compound is copolymerized and the amount of (meth)acrylic based monomers is increased, the impact strength and the flow properties improve more and, thereby, such resins may be employed as a super high flow property material.

As shown in comparative examples 3 and 4, when an aromatic vinyl based monomer (b1) and an unsaturated nitrile monomer (b2) is copolymerized and only a silicon based compound without (meth)acrylic monomer (comparative example 3) or a (meth)acrylic monomer (comparative example 4) is used, the flow property is somewhat increased, without any improvement of the impact strength. Further, as shown in comparative example 5, if a silicon compound with a large amount (more than 10 mmol/g) of (meth)acrylic monomer and vinyl is used, the improvement of flow properties and impact strength does not occur.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. An aromatic vinyl based thermoplastic resin composition comprising:
   (A) about 10 to about 99% by weight of a thermoplastic resin including (a1) an aromatic copolymer resin; (a2) a rubber-modified vinyl graft copolymer; or a combination of (a1) and (a2); and
   (B) about 1 to about 90% by weight of a branched aromatic vinyl copolymer resin including a silicon based compound, wherein (B) the branched aromatic vinyl copolymer resin including a silicon based compound is a copolymer or a combination of copolymers prepared by copolymerizing:
   (b1) about 10 to about 85% by weight of an aromatic vinyl based monomer;
   (b2) about 10 to about 85% by weight of an unsaturated nitrile based monomer;
   (b3) about 1 to about 50% by weight of a (meth)acrylic monomer, wherein (b3) the (meth)acrylic monomer comprises an aromatic methacrylate, aliphatic methacrylate, or a combination thereof having a structure represented by Formula 1, Formula 2, or a combination thereof below or a combination of (meth)acrylic monomers copolymerizable with an aromatic methacrylate, aliphatic methacrylate, or a combination thereof having a structure represented by Formula 1, Formula 2, or a combination thereof below:

[Formula 1]
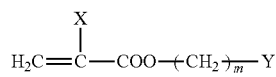

wherein m is an integer from 0 to 20, X is hydrogen or methyl, Y is methyl, cyclohexyl, phenyl, benzyl, methylphenyl, methylethylphenyl, methoxyphenyl, cyclohexylphenyl, chlorophenyl, bromophenyl, phenylphenyl, or benzyl phenyl,

[Formula 2]
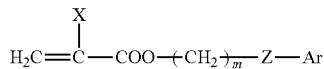

wherein m is an integer from 0 to 20, X is hydrogen or methyl, Z is oxygen (O) or sulfur (S), and Ar is methyl, cyclohexyl, phenyl, benzyl, methylphenyl, methylethylphenyl, methoxyphenyl, cyclohexylphenyl, chlorophenyl, bromophenyl, phenylphenyl, or benzyl phenyl; and (b4) about 0.1 to about 20% by weight of a silicon based compound having two or more unsaturated functional groups, wherein the vinyl content of (b4) the silicon based compound having two or more unsaturated functional groups is about 0.05 to about 10 mmol/g.

2. The aromatic vinyl thermoplastic resin composition of claim 1, wherein the weight average molecular weight of (B) the branched aromatic vinyl copolymer resin including a silicon based compound is about 5,000 to about 5,000,000.

3. The aromatic vinyl thermoplastic resin composition of claim 1, wherein the aromatic vinyl based monomer (b1) comprises styrene, p-methylstyrene, α-methylstyrene, halogen-substituted styrene, C1-C10 alkyl-substituted styrene, or a mixture thereof.

4. The aromatic vinyl thermoplastic resin composition of claim 1, wherein (b2) the unsaturated nitrile based monomer comprises acrylonitrile, methacrylonitrile, or a mixture thereof.

5. The aromatic vinyl thermoplastic resin composition of claim 1, wherein the aromatic methacrylate, aliphatic methacrylate, or combination thereof comprises cyclohexyl (meth)acrylate, phenoxymethacrylate, phenoxyethylmethacrylate, 2-ethylphenoxymethacrylate, 2-ethylthiophenylmethacrylate, 2-ethylaminophenylmethacrylate, phenylmethacrylate, benzylmethacrylate, 2-phenylethylmethacrylate, 3-phenylpropylmethacrylate, 4-phenylbutylmethacrylate, 2-2-methylphenylethylmethacrylate, 2-3-methylphenylethylmethacrylate, 2-4-methylphenylethylmethacrylate, 2-(4-propylphenyl)ethylmethacrylate, 2-(4-(1-methylethyl)phenyl)ethylmethacrylate, 2-(4-methoxyphenyl)ethylmethacrylate, 2-(4-cyclohexylphenyl)ethylmethacrylate, 2-(2-chlorophenyl)ethylmethacrylate, 2-(3-chlorophenyl)ethylmethacrylate, 2-(4-chlorophenyl)ethylmethacrylate, 2-(4-bromophenyl)ethylmethacrylate, 2-(3-phenylphenyl)ethylmethacrylate, 2-(4-benzylphenyl)ethylmethacrylate or a mixture thereof.

6. The aromatic vinyl thermoplastic resin composition of claim 1, wherein (b4) the silicon based compound having two or more unsaturated functional groups comprises one or more silicon based compounds having two or more unsaturated functional groups in a terminal or side chain represented by Formula 3 below:

[Formula 3]
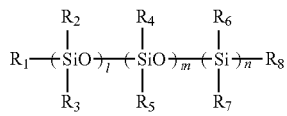

wherein l, m and n are each independently an integer from 0 to 100, with the proviso that l+m+n is not 0, and $R_1$ to $R_8$ are each independently hydrocarbon, vinyl, hydroxyl, amino, ureido, isocyanate, episulfide, epoxy or mercapto, with the proviso that at least two or more of the $R_1$ to $R_8$ includes a polymerizable unsaturated functional group.

7. The aromatic vinyl thermoplastic resin composition of claim 6, wherein (b4) the silicon based compound having two or more unsaturated functional groups comprises dimethoxymethylvinylsilane, diethoxymethylvinylsilane, diacetoxymethylvinylsilane, 1,1,1,3,5,5,5,-heptamethyl-3-vinyltrisiloxane, 2,4,6,8-tetramethyl tetravinylcyclotetrasiloxane, α,ω-divinylpolydimethylsiloxane, modified-vinyl dimethylsiloxane or a mixture thereof.

8. The aromatic vinyl thermoplastic resin composition of claim 1, wherein (b4) the silicon based compound having two or more unsaturated functional groups is a linear compound containing at least two or more polymerizable unsaturated functional groups.

9. The aromatic vinyl thermoplastic resin composition of claim 1, wherein (b4) the silicon based compound having two or more unsaturated functional groups is a ring-shaped compound containing at least two or more polymerizable unsaturated functional groups.

10. The aromatic vinyl thermoplastic resin composition of claim 1, wherein (b4) the silicon based compound having two or more unsaturated functional groups has a viscosity of below about 5,000 cPs.

11. The aromatic vinyl thermoplastic resin composition of claim 1, wherein the aromatic vinyl copolymer resin (a1) is a copolymer or a mixture of copolymers prepared by copolymerizing about 50 to about 95% by weight of an aromatic vinyl compound or a mixture thereof and about 5 to 50% by weight of a (meth)acrylic acid alkyl ester or a mixture thereof.

12. The aromatic vinyl thermoplastic resin composition of claim 1, wherein the rubber-modified vinyl graft copolymer (a2) is a grafted copolymer prepared by graft-polymerizing about 5 to about 95% by weight of a vinyl based monomer mixture and about 5 to about 95% by weight of a rubbery polymer.

13. The aromatic vinyl thermoplastic resin composition of claim 1, wherein the aromatic vinyl thermoplastic resin composition has an Izod impact strength (⅛") of about 15 to about 60 kgf·cm/cm measured according to ASTM D256 and a melt index of about 15 to about 60 g/10 min measured according to ASTM D1238 (220° C., 10 kg).

14. The aromatic vinyl thermoplastic resin composition of claim 1, further comprising one or more additives selected from the group consisting of surfactants, nucleating agents, coupling agents, fillers, plasticizers, impact modifiers, lubricants, antimicrobial agents, release agents, heat stabilizers, antioxidants, light stabilizers, compatibilizers, inorganic fillers, dyes, stabilizers, antistatic agents, pigments, flame proofing agents and mixtures thereof.

15. A plastic article prepared by extruding the aromatic thermoplastic resin composition of claim 1.

16. An alloyed aromatic vinyl thermoplastic resin composition prepared by alloying the aromatic vinyl thermoplastic resin composition of claim 1 and one or more resins comprising polycarbonate (PC) resin, polymethylmethacrylate (PMMA) resin, polyolefin resin, polyphenylene ether (PPE) resin, polyester resin, polyamide resin, polyimide resin, or a mixture thereof.

* * * * *